Jan. 31, 1967    G. H. FATHAUER    3,301,341
WEIGHBRIDGE SHOCK MOUNT
Filed Jan. 27, 1965
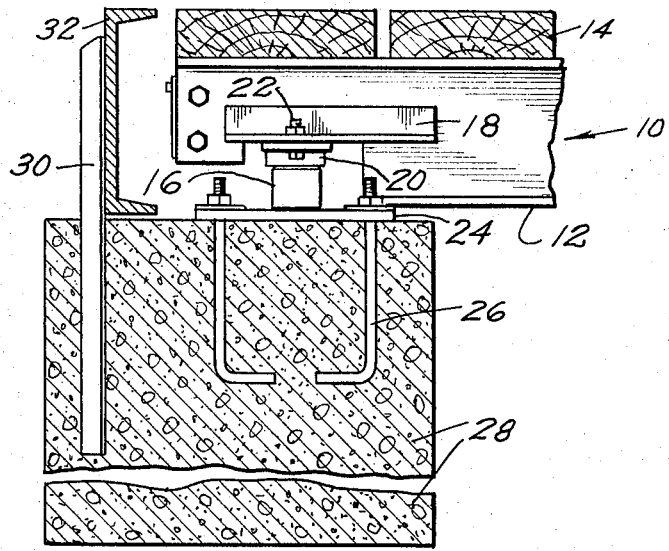
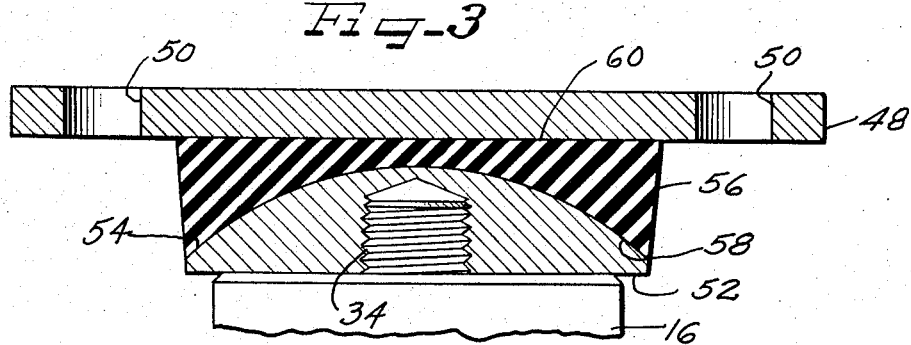
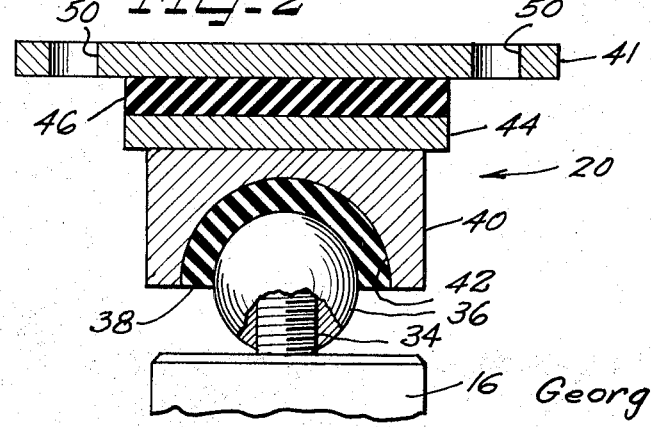
INVENTOR.
George H. Fathauer
BY Hill, Sherman, Meroni, Gross & Simpson
ATTORNEYS

United States Patent Office 3,301,341
Patented Jan. 31, 1967

3,301,341
WEIGHBRIDGE SHOCK MOUNT
George H. Fathauer, Decatur, Ill., assignor to The Dole Valve Company, Morton Grove, Ill., a corporation of Illinois
Filed Jan. 27, 1965, Ser. No. 428,304
4 Claims. (Cl. 177—184)

This invention relates generally to shock mounts and more particularly to a method and means for mounting a platform of a weighbridge on load cells. The present invention also has application in the support of tanks, aggregate hoppers, and similar structures.

Weighbridges, which are employed for weighing vehicles, commonly include a deck or platform which is co-extensive with a road surface and is supported by a plurality of beams. The entire deck structure including the beams are supported at, at least, four corners thereof on load cells which provide an indication of any weight placed on the platform.

A considerable number of problems exist with such structures, however, due to angular deflection and lateral movement of the beams with respect to the anchor points for the load cells. Additional problems arise when the deck structure is misaligned with respect to the anchor points of the load cells and changes occur with temperature and humidity in the dimensional characteristics of the deck structure.

Angular or arcuate deflection is caused when a weight is placed on the platform, since the beams are supported at their ends on the load cells. Such angular deflection of the beam with respect to the load cells places undesired forces on the load cells. That is, the load cell will be twisted in its anchored position by angular deflection of the beam.

Lateral loads on the deck structure caused by movement of a vehicle thereon are transferred directly to the load cells. These lateral forces are produced when the vehicle starts and stops its movement on the platform. Such lateral movement of the deck or platform with respect to the load cells causes moments of force to be exerted on the load cells. These forces may be in a shear plane with respect to the load capabilities of the load cell and as such tend to produce a damaging effect thereon.

Some of the above-mentioned difficulties have been partially overcome by designing the load cells with sufficient strength capabilities to withstand twisting forces. It can be readily appreciated, however, that such design of the load cell will greatly increase their production cost to the extent that the greatest part of the cost of the load cell is determined by the materials employed strictly for increasing the strength of the cell.

These difficulties of lateral and angular deflection of the platform have been partially overcome by providing a hardened steel spherical bearing at the anchor point of the load cell. The anchor point is made in a loose fit with respect to the spherical bearing to accommodate lateral movement of the load cell with respect to the anchor point. Angular deflection of the platform causes the load cell to pivot on the spherical bearing thereby relieving bending moments and side loads on the load cell. However, it can be readily appreciated that the load force becomes angularly displaced with respect to the longitudinal axis of the load cell causing inaccurate reading of the weight on the platform.

Still another solution to the above problems has been provided by the use of rods secured at one end to the anchor point of the load cell and at the other end to a point on the beam spaced from the load cell. The rods are positioned in substantially parallel relationship with the beams thereby absorbing lateral movement of the beam without effecting the vertical force of the weight on the load cell. However, these stabilizing rods also produce errors in the indication of the weight placed on the platform and are not completely effective in reducing the lateral loads on the load cell. Also, misalignment and dimensional changes with temperature can not be compensated for by the use of such stabilizing rods. Since these stabilizing rods were ineffective for angular displacement of the beam with respect to the load cell, hardened steel spherical bearing points had to be employed therewith, resulting in excessive hardware and cost.

The above difficulties are eliminated by means of the present invention wherein a shock mount is employed between the platform and the load cell which absorbs both lateral and angular movement of the platform with respect to the cell. The shock mount of the present invention generally includes resilient means so shaped to allow both lateral and angular movement or deflection of the platform with respect to the load cell.

It is, therefore, an object of the present invention to provide a shock mount between the platform and the load cell of a weighbridge which will absorb both lateral and angular forces exerted on the load cell from the platform.

It is another object of the present invention to provide a shock mount which allows the elimination of hardened steel spherical bearing points for load cells.

Still another object of the present invention is to provide a shock mount for a load cell of a weighbridge which eliminates stabilizing rods and other stabilizing structures which are intended to reduce undesired forces on the load cell from lateral loads, angular displacement of the platform, misalignment, and dimensional changes due to temperature.

And another object of the present invention is to provide a shock mount for a load cell of a weighbridge which substantially reduces the cost of the device.

Still another object of the present invention is to provide a method of eliminating angular and lateral forces from a load cell by allowing both angular and lateral compliance of the platform with respect to the load cell.

These and other objects, features and advantages of the present invention will be more fully realized and understood from the following detailed description when taken in conjunction with the accompanying drawings, wherein:

FIGURE 1 is a side view partially broken away and in partial section illustrating the anchoring structures for the platform of a weighbridge;

FIGURE 2 is a sectional side elevational view partially broken away of one embodiment of the shock mount of the present invention; and FIGURE 3 is a sectional side elevational view of another embodiment of the present invention.

With reference to FIGURE 1, there is shown one corner portion of a weighbridge platform, generally designated with the reference numeral 10. The platform includes a support beam 12 having a floor or deck composed of planks 14 thereon. One portion at one end of the beam 12 is cut away to receive a load cell 16 therein in direct alignment with the beam 12. A flanged member 18 is secured at either side of the beam 12 for fastening of the load cell 16 to the beam.

Interposed between the flanged member 18 on the beam 12 and the load cell 16 is a shock mount 20 which is secured to the flange 18 by means of a bolt and nut 22. The particular details of the shock mount 20 will be explained in more detail in the description of the subsequent figures.

The load cell 16 is supported on a plate 24 which is anchored by means of anchor bolts 26 to a concrete foundation 28. A vertical member 30 extends from the foundation and supports a channel 32 thereon having one end thereof coextensive with the top of the platform 10 and with ground level. In this manner, vehicles may be driven onto the floor 14 of the platform 10 and an indication of their weight may be provided from the load cells 16 located at each corner of the platform 10.

One embodiment of the shock mount 20 is illustrated in FIGURE 2. The load cell 16 includes a threaded bolt 34 at an upper end thereof for receiving a spherical member 36 thereon. A spherically shaped resilient member 38, preferably of rubber material, is bonded to the spherical member 36, preferably by vulcanization. A block 40 includes a spherical cavity 42 therein for receiving the spherically shaped resilient member 38. The member 38 is secured by bonding, and preferably by vulcanization to the surface of the cavity 42 of the block 40. An intermediate plate 44 is secured to the top of the block 40 by any suitable means and a flat resilient member 46, preferably of rubber material, is bonded to the intermediate plate 44. A mounting plate 48 including mounting holes 50 therein is bonded to an upper surface of the flat resilient member 46. Bonding of the resilient member 46 to the intermediate plate 44 and the mounting plate 48 is preferably by vulcanization.

The shock mount 20 as illustrated in FIGURE 2 is secured to the flanged member 18 by means of the bolt and nut 22. When the platform 10 is deflected in an arcuate fashion to cause angular movement of the platform 10 with respect to the load cell 16, the resilient spherical member 38 is compliant to such movement and substantially removes any resultant strain from the load cell 16. Therefore, the load cell 16 realizes the full force of the weight on the platform 10 in a longitudinal direction rather than at some angle from the longitudinal axis therethrough. Since the members 36 and 38 are spherically shaped, angular deflection of the beam 12 with repsect to the load cell 16 in any direction is absorbed within the member 38. However, it will be appreciated that the spherical member 36, the resilient member 38 and the cavity 42 may be cylindrically shaped or otherwise arcuately shaped as desired to comply with the angular deflection of the platform 10 with respect to the load cell 16.

Lateral movement of the platform 10 with respect to the load cell 16 is absorbed by compliance of the resilient member 46. When a lateral load is applied to the platform 10, the resilient member 46 complies therewith and relieves the resultant forces from the load cell 16.

The embodiment illustrated in FIGURE 2, although providing a high degree of compliance to lateral and angular deflections of the platform 10 with respect to the load cell 16, is not particularly suited to some applications because of the dimensional requirement between the mounting plate 48 and the load cell 16. The embodiment illustrated in FIGURE 3, however, substantially shortens the distance required between the mounting plate 48 and the load cell 16 and, in addition, reduces substantially the cost of the shock mount over that of the embodiment of FIGURE 2.

With reference to FIGURE 3, like reference numerals employed therein with those of FIGURES 1 and 2 are intended to designate the same or similar structures. As shown therein, the load cell 16 includes a threaded bolt 34 thereon for receiving the shock mount. The shock mount of FIGURE 3 includes a member 52 for receiving the threaded bolt 34 therein and includes a spherically shaped surface 54 thereon. A resilient member 56 includes a spherically shaped cavity surface 58 which is conformably shaped and bonded to the surface 54 of the member 52. The resilient member 56 also includes a flat surface 60 opposite the spherically shaped cavity surface 58 which is bonded to the mounting plate 48. The member 56 is preferably bonded to the members 52 and 48 by means of vulcanization.

The shock mount of FIGURE 3 provides compliance to both lateral and angular deflection of the platform 10 with respect to the load cell 16 by means of the single resilient member 56. The resilient member 56 performs the same function as the resilient members 38 and 46 of the shock mount illustrated in FIGURE 2. That is, angular deflection of the platform 10 with respect to the load cell 16 is absorbed by the member 56 along the spherically shaped cavity surface 58. Lateral movement, however, is absorbed by the resilient member 56 by the material therein which is parallel to the surface 60.

In the embodiment of FIGURE 3, it will be appreciated that the surfaces 54 and 58 may also be made cylindrical or any desired arcuate shape for receiving particular types of loads on the platform 10.

It may be readily appreciated from the above description of the embodiments of FIGURES 2 and 3 that the shock mounts illustrated therein eliminate the need for a loose fitting anchor point between the load cell and the foundation and further eliminates the need for stabilizing rods between the platform and the foundation. Also, since lateral and angular compliance is provided by the shock mounts of the present invention, forces other than those along the longitudinal axis of the load cell are substantially eliminated. Therefore, accuracy of weight indication is substantially improved with the shock mounts of the present invention. Furthermore, misalignment and dimensional changes due to temperature differentials are absorbed by the illustrated shock mounts.

It may be readily appreciated that various structures may be employed to provide the same novel function achieved by the structures of the present invention. It will be fully appreciated that any method of absorbing forces produced by angular and lateral movement between the platform of the weigh bridge and the load cell will achieve similar results to those of the present invention. The embodiments shown and described, however, achieve these results with a minimum of cost and maximum accuracy in the weighing of a particular load. Therefore, this invention contemplates the method of absorbing the angular and lateral forces by yieldably retaining the platform in a lateral direction with respect to the load cell and by allowing rotational compliance of the platform with respect to the load cell. That is, the angular and lateral forces on a load cell may be absorbed by the method of first yieldably retaining the platform with respect to the load cell along a flat surface and secondly yieldably retaining the platform with respect to the load cell along an arcuate surface. With the load cell positioned as shown in FIGURE 1 of the drawings, the arcuate surface is preferably positioned in tangential relationship with the flat surface.

The principles of the invention explained in connection with the specific exemplifications thereof will suggest many other applications and modifications of the same. It is accordingly desired that, in construing the breadth of the appended claims they shall not be limited to the specific details shown and described in connection with the exemplifications thereof.

What is claimed is:

1. A shock mount comprising
    (a) a first mounting member having an arcuate surface,
    (b) a second mounting member having a flat surface, and
    (c) an intermediate member having resilient material at opposite surfaces thereof, one of said surfaces of said intermediate member conformably shaped to and secured solely by bonding to said arcuate surface and another of said surfaces of said intermediate member directly opposite said one surface thereof conformably shaped to and secured solely by bonding to said flat surface, the respective surfaces of said intermediate member being entirely coextensive with said flat surface and said arcuate surface.

2. A shock mount as defined in claim 1 wherein said arcuate surface is spherical.

3. A shock mount as defined in claim 1 wherein said intermediate member is entirely resilient.

4. A shock mount as defined in claim 1 wherein said intermediate member includes a curved resilient piece conformably shaped to said arcuate surface and forming said one surface thereof, a block having a cavity therein for receiving said curved resilient piece, and a flat resilient piece secured to said block and forming said other surface of said intermediate member.

References Cited by the Examiner

UNITED STATES PATENTS

| | | | |
|---|---|---|---|
| 368,063 | 8/1887 | Brown | 177—1 |
| 961,312 | 6/1910 | Nolen et al. | 248—358 X |
| 1,754,308 | 4/1930 | Cowell et al. | 248—22 |
| 1,807,451 | 3/1931 | Stebbins | 248—358 X |
| 1,859,777 | 5/1932 | Keys et al. | 248—9 |
| 1,872,259 | 8/1932 | Eldridge | 248—9 |
| 1,885,356 | 11/1932 | Karrer | 177—1 |
| 2,092,919 | 9/1937 | Johnson | 248—22 |
| 2,270,902 | 1/1942 | Rubissow | 248—358 |
| 2,438,757 | 3/1948 | Lee | 248—10 X |
| 2,491,229 | 12/1949 | Taylor | 248—358 |
| 2,646,236 | 7/1953 | Williams | 177—134 X |
| 2,652,241 | 9/1953 | Williams | 177—208 |
| 2,743,892 | 5/1956 | Mordarski et al. | 248—24 |
| 2,762,600 | 9/1956 | Mordarski et al. | 248—358 |
| 2,868,570 | 1/1959 | Hines et al. | 177—211 X |
| 2,932,501 | 4/1960 | Hicks | 177—209 |
| 3,145,795 | 8/1964 | Tate | 177—208 |
| 3,176,508 | 4/1965 | Ward | 177—184 X |

FOREIGN PATENTS

| | | |
|---|---|---|
| 819,281 | 7/1937 | France. |
| 160,513 | 9/1957 | Sweden. |

OTHER REFERENCES

Voigt, German application, 1,106,191, printed May 1961.

RICHARD B. WILKINSON, *Primary Examiner.*

LEO SMILOW, *Examiner.*

G. J. PORTER, ROBERT S. WARD,
*Assistant Examiners.*